Feb. 19, 1952 M. A. STRIVENS 2,586,113
DIELECTRIC AND PROCESS OF MAKING
Filed Aug. 5, 1948
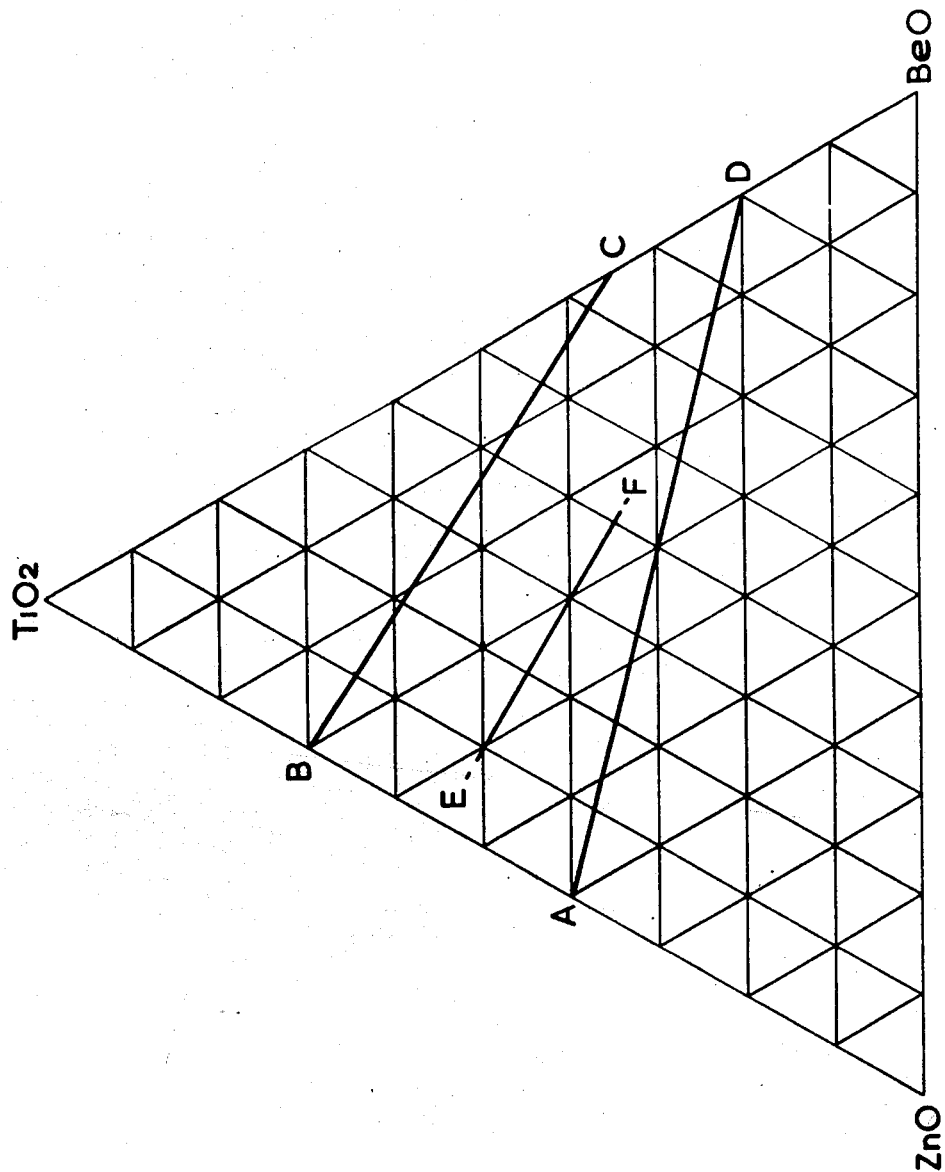
Inventor
MAURICE ANDREW STRIVENS
By Wenderoth, Lind & Ponack
Attorneys Patented Feb. 19, 1952

2,586,113

UNITED STATES PATENT OFFICE 2,586,113

DIELECTRIC AND PROCESS OF MAKING

Maurice Andrew Strivens, Bridgwater, England, assignor to The Hartford National Bank and Trust Company, Hartford, Conn., as trustee Application August 5, 1948, Serial No. 42,691
In Great Britain August 7, 1947

5 Claims. (Cl. 106—39)

This invention relates to dielectric and process of making and more particularly to the type which employs a ceramic material as the dielectric. It is a disadvantage of electrical condensers of the ceramic dielectric type, particularly those employing ceramic materials of high or medium permittivity, that the temperature coefficient of capacity is often high and not adjustable. It is also a disadvantage in most ceramics of high or medium permittivity in which the best properties such as low losses, small temperature dependence of the electrical properties and high electrical strength are sought, that high-sintering temperatures of 1400°–1500° C. have to be used to render the material non-porous, and this is uneconomic in manufacture. In many instances also the components or some of the components must be prefired in order to eliminate unwanted gaseous or volatile matter which would otherwise increase the porosity, and also in order to increase the density of the material so that cracking is avoided in the final firing.

The purpose of this invention is to provide ceramic materials of permittivity greater than 20, which are suitable for electrical condenser dielectrics, and which possess predetermined low or zero temperature coefficients of capacity.

According to the present invention an electrical condenser is constructed in which the dielectric consists of a sintered mixture of the oxides of titanium, zinc and/or beryllium.

In particular in order to produce ceramic dielectric materials of permittivity greater than 20 with temperature coefficients of permittivity between +500 and −500 parts per million per degree centigrade, the molecular percentage of the oxide of titanium should lie between 20 and 35 in the absence of the oxide of zinc and between 40 and 70 in the absence of the oxide of beryllium and between intermediate values obtained by linear interpolation when zinc and benyllium oxides are present together. In other words, the composition should fall within the area of the quadrilateral ABCD in the ternary diagram shown in the accompanying drawing.

The temperature coefficient of capacitance can be chosen to have any desired value between certain positive and negative limits, as exemplified in the case of a sintered mixture of the oxides of titanium and zinc in the appended table (Table I).

TABLE I

Variation of permittivity and its temperature coefficient with the ratio Zn : Ti

| Mol. Per Cent ZnO | Mol. Per Cent TiO₂ | Permittivity at 20° C., 1.6 mc./s. | Temp. Coeff., P. P. M. 20°-70° C. |
|---|---|---|---|
| 45 | 55 | 35.0 | −160 ±15 |
| 47.5 | 52.5 | 33.0 | −90 ±20 |
| 49 | 51 | 30.8 | −56 ±25 |
| 50 | 50 | 28.4 | 0 ±30 |
| 55 | 45 | 21.6 | +148 ±15 |

To any choice of temperature coefficient there corresponds a number of compositions which possess differing permittivities. This is a further advantage in that for a selected temperature coefficient of capacitance, the capacity of a condenser may be varied within certain limits without necessitating a change in dimensions and hence a change in the construction of the die used in forming the dielectric. Thus a range of capacitances of any given temperature coefficient can be produced by selecting the appropriate compositions on the ternary diagram. Examples of these compositions with the dielectric properties are shown in the appended table (Table II) and are represented by the line EF in the ternary diagram.

TABLE II

Compositions having a temperature coefficient of permittivity of −120 P. P. M.

| Mol. Per Cent TiO₂ | Mol. Per Cent BeO | Mol. Per Cent ZnO | Permittivity at 20° C., 1.6 mc./s. | Loss Angle tan δ . 10⁴ |
|---|---|---|---|---|
| 50 | 10 | 40 | 35.1 | <1 |
| 45 | 20 | 35 | 32.0 | <1 |
| 40 | 30 | 30 | 30.0 | <1 |
| 35 | 40 | 25 | 28.0 | <1 |

Ceramic dielectric electrical condensers according to the present invention, may be constructed in any of the forms adopted for solid dielectric condensers.

In carrying out the invention the oxides of zinc, beryllium and titanium, or any compounds of these elements which decompose on firing to give the said oxides, are used as raw materials. The oxides may be mixed by any of the methods known to the ceramic art, and at this stage binders such as gum tragacanth, starch or any other temporary binder may be included for the purpose of forming or extruding the shapes required. Permanent fluxes such as bentonite, clays or steatite which may aid in the extruding and forming processes and the firing process may also be included in amounts not exceeding 10% by weight of the total weight of the mix.

The shaped pieces are then fired in an oxidising or neutral atmosphere at temperatures up to but generally not exceeding 1320° C. Any firing schedule which yields a suitably vitrified ceramic body may be used, the maturing temperature being selected to suit the particular composition chosen. In general, in the manufacture of condensers according to the invention prefiring of the oxide mix is not necessary, which represents a simplification in the manufacturing process.

The formed ceramic dielectric material is provided with electrodes, connecting wires and leads, and, if desired, protection from atmospheric influences, according to established processes well known in the art.

I claim:

1. A process of manufacturing a dielectric for a condenser dielectric comprising the steps of mixing approximately between 35 and 50 mol. per cent of titanium dioxide, approximately between 10 and 40 mol. per cent of BeO and approximately between 25 and 40 mol. per cent of ZnO, and thereafter heating the mixture of oxides at a temperature less than 1320° C. to form a mixed titanate of beryllium and zinc.

2. A process of manufacturing a condenser dielectric as claimed in claim 1, in which the heating is effected in an oxidizing atmosphere.

3. A process of manufacturing a condenser dielectric as claimed in claim 1, in which the heating is effected in a neutral atmosphere.

4. A capacitor dielectric consisting of sintered product of approximately 35 to 50 mol. per cent of $TiO_2$ approximately 10 to 40 mol. per cent of BeO and 25 to 40 mol. per cent of ZnO.

5. A capacitor dielectric consisting of a sintered mixture of BeO, ZnO and $TiO_2$ in the proportions defined wholly within the quadrilateral ABCD of the accompanying drawing.

MAURICE ANDREW STRIVENS.

REFERENCES CITED

The following references are of record in the file of this patent:

UNITED STATES PATENTS

| Number | Name | Date |
|---|---|---|
| 2,098,812 | Pulfrich | Nov. 9, 1937 |
| 2,277,734 | Wainer et al. | Mar. 31, 1942 |
| 2,328,410 | Berge | Aug. 31, 1943 |
| 2,369,327 | Wainer | Feb. 13, 1945 |
| 2,432,250 | Rath | Dec. 9, 1947 |
| 2,436,840 | Wainer | Mar. 2, 1948 |

FOREIGN PATENTS

| Number | Country | Date |
|---|---|---|
| 888,759 | France | 1943 |
| 366,520 | Italy | 1938 |